United States Patent
Kempf et al.

(10) Patent No.: US 11,754,905 B2
(45) Date of Patent: Sep. 12, 2023

(54) PHASED SPATIAL LIGHT MODULATOR FOR IMAGING

(71) Applicant: Texas Instruments Incorporated, Dallas, TX (US)

(72) Inventors: Jeffrey Matthew Kempf, Dallas, TX (US); Nirmal C. Warke, Saratoga, CA (US); David P. Magee, Allen, TX (US); Rahmi Hezar, Allen, TX (US); Baher S. Haroun, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 804 days.

(21) Appl. No.: 16/586,644

(22) Filed: Sep. 27, 2019

(65) Prior Publication Data
US 2021/0096442 A1    Apr. 1, 2021

(51) Int. Cl.
*G01S 17/08* (2006.01)
*G02F 1/29* (2006.01)
*G01S 7/481* (2006.01)

(52) U.S. Cl.
CPC ............ *G02F 1/292* (2013.01); *G01S 7/4814* (2013.01); *G01S 17/08* (2013.01)

(58) Field of Classification Search
CPC ........ G02F 1/292; G01S 7/4814; G01S 17/08; G01S 7/4815; G01S 17/931
See application file for complete search history.

(56) References Cited

U.S. PATENT DOCUMENTS

| | | | |
|---|---|---|---|
| 2010/0103485 A1* | 4/2010 | Haussler | G03H 1/02 359/9 |
| 2017/0299882 A1* | 10/2017 | New | G01B 11/27 |
| 2018/0341020 A1 | 11/2018 | Magee et al. | |
| 2019/0018107 A1 | 1/2019 | Warke et al. | |

FOREIGN PATENT DOCUMENTS

DE              2588742 A1 *   6/2006

* cited by examiner

Primary Examiner — Jennifer Doan
(74) *Attorney, Agent, or Firm* — Valerie M. Davis; Frank D. Cimino

(57) ABSTRACT

In described examples, a system (e.g., a security system or a vehicle operator assistance system) is configured to configure a phased spatial light modulator (SLM) to generate a diffraction pattern. A coherent light source is optically coupled to direct coherent light upon the SLM. The SLM is configured to project diffracted coherent light toward a region of interest. An optical element is configured to focus the diffracted coherent light toward the at least one region of interest.

19 Claims, 7 Drawing Sheets

PHASED SPATIAL LIGHT MODULATOR FOR IMAGING

BACKGROUND

In some detection systems, radio waves (e.g., in the form of acoustic, light and/or radio energy) are emitted into a region of interest and return reflections of the emitted waves are processed to determine the presence and/or position of objects within a detection range. In some applications, the detection range afforded by emitted light (e.g., during the day) can be limited because of eye safety limits on optical power levels. Moreover, the resolution for detecting smaller objects can be limited because of frequency (e.g., wavelength) and allowed power of the emitted radio waves.

SUMMARY

In described examples, a system (e.g., a security system or a vehicle operator assistance system) is configured to configure a phased spatial light modulator (SLM) to generate a diffraction pattern. A coherent light source is optically coupled to direct coherent light upon the SLM. The SLM is configurable to project diffracted coherent light toward a region of interest. An optical element is configured to focus the diffracted coherent light toward the at least one region of interest.

DETAILED DESCRIPTION

Figure 1:
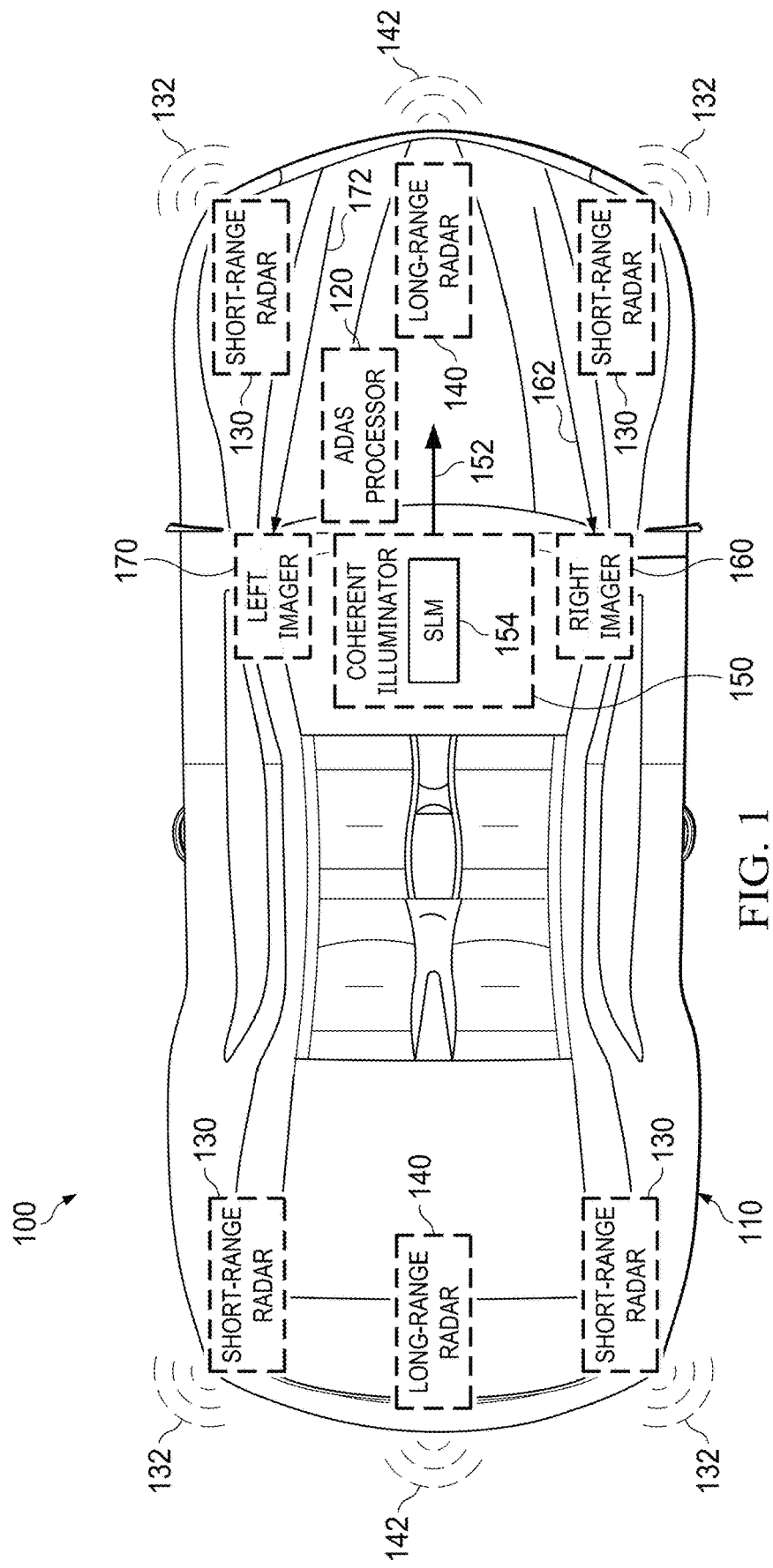
FIG. 1 is a system diagram showing an example vehicle that includes an example phased spatial light modulation (SLM) 3D imaging system.

In the drawings, like reference numerals refer to like elements, and the various features are not necessarily drawn to scale.

Various detection systems employ emitters and sensors of radio waves to perform sensing and ranging. Some detection systems (such as security systems) can be installed in a fixed location, while some detection systems (such as an advanced drivers assistance system, ADAS) can be installed in a mobile platform (such as a motor vehicle). In an example ADAS system, radio waves (e.g., in the form of acoustic, light and/or radio energy) are emitted from a vehicle, so that return reflections can be processed to determine the presence and/or positioning of objects in areas surrounding and/or in front of the vehicle.

In some vehicular detection systems, the detection range afforded by emitted light (e.g., during the day) can be limited because of eye safety limits on optical power levels. For example, the power of light emitted for illuminating areas in front of and around the vehicle can be limited for eye safety reasons (e.g., to avoid permanent retina damage). Moreover, the resolution for detecting small objects by some vehicular detection systems can be limited because of frequencies (e.g., wavelengths) and allowed power of radio waves that can be broadcasted by such systems for detection purposes.

The accuracy of a vehicular detection system determines levels of safety that can be afforded by the vehicular detection system. For example, failure to detect objects within a certain range (e.g., within a safe braking distance) or failure to detect objects of a certain size (e.g., a size of a pothole or an animal) can decrease levels of safety provided by a vehicular detection system. Increasing the accuracy (e.g., by increasing the range and resolution) of a vehicular detection system can increase the safety of occupants of a driven vehicle that includes the vehicle detection system. Further, safety can be also be increased for other motorists, pedestrians and animals in or around the path of the driven vehicle.

FIG. 1 is a system diagram showing an example vehicle that includes an example phased spatial light modulation (SLM) 3D imaging system. Generally described, the system 100 is an example system that includes a host vehicle 110. An advanced drivers assistance system (ADAS) can be installed in the host vehicle 110. The ADAS can include at least one ADAS processor 120, which can be programed to execute any of the processing techniques described herein. For example, the ADAS processor 120 is configured to program a phased spatial light modulator (SLM, described hereinbelow) to generate a diffraction pattern responsive to an at least one region of interest, where the diffraction pattern includes (e.g., defines and/or forms) an area of constructive interference adapted to illuminate the at least one region of interest, and where the SLM is configurable (e.g., is programmable) to diffract the coherent light responsive to the diffraction pattern to generate diffracted coherent light (e.g., so that portions of the diffracted coherent light are diffracted so that any target within a region of interest is more brightly illuminated).

An example ADAS system can include sensors such as radio wave (including microwave) transmitters and receivers. For example, the system 100 includes a short-range radar 130 at each of four corners (e.g., driver-front corner, driver-rear corner, passenger-rear corner and passenger front corner) of the host vehicle 110. Each of the short-range radars 130 is arranged to emit a respective radio wave 132 (e.g., as radio-wave energy). Each respective radio wave 132 can be emitted, for example, as a pulsed-doppler and/or a continuous wave. Each of the short-range radars 130 is arranged to receive and process return reflections of the emitted radio wave 132 to detect, for example, a "target" (e.g., to detect an object illuminated by the radio wave 132). Because of relatively high costs associated with mechanically steered and active or passive beam-scanned array systems, azimuth (and/or elevation) of radar-illuminated targets (e.g., within regions of interest) are not necessarily determined by each respective short-range radar 130. The ADAS processor 120 can scan outputs of each of the short-range radars 130 and generate an indication of the location of a region of interest by associating a detection of a target with the area of coverage (e.g., within a relatively short distance to at least one of the four corners) of the short-range radar 130 that detects a specific target. A region of interest is a region that includes (e.g., potentially includes) objects that can potentially affect the operation and/or safety of a system that includes the ADAS system.

The region of interest can be selected by the ADAS processor 120 in response to at least one signal generated by at least one sensor. The region of interest can be selected (e.g., defined) responsive to a heading (e.g., bearing) of a vehicle (e.g., where the region of interest can be an area in front of a direction of travel of the vehicle). In an example, region of interest is determined by a ranging sensor (e.g., such as a lidar, radar, sonar or inductive sensor, which can generate an indication of target that can be related to a heading or a position of the vehicle).

The location (e.g., boundaries) of a region of interest can be indicated (for example) by a signal. In one example, a location of a region of interest can be indicated by a signal that includes two-dimensions of a three-dimensional polar coordinate system positioned with the host vehicle 110 at the center of the polar coordinate system. In another example, a location of a region of interest can be indicated by signal that includes two dimensions of a three-dimensional Cartesian coordinate system positioned with the host vehicle 110 at the center of the Cartesian coordinate system.

The system 100 includes long-range radars. For example, the system 100 includes a long-range radar 140 respectively at the front and at the rear of the host vehicle 110. The long-range radars 140 are arranged to emit a respective radio wave 142 (e.g., that includes a transmitted beam that is narrower and more powerful than a beam of a radio wave 132). Each respective radio wave 142 can be emitted, for example, as a pulsed-doppler and/or a continuous wave. Each of the long-range radars 140 is arranged to receive and process return reflections from the emitted radio wave 142 to detect, for example, a target. Azimuth (and/or elevation) of radar-illuminated targets are not necessarily determined by each respective long-range radar 142. The ADAS processor 120 can scan outputs of each of the long-range radars 140 and generate an indication of the location of a region of interest by associating a detection of a target with the area of coverage (e.g., within a relatively long distance to the front or rear of the host vehicle 110) of the long-range radar 140 that detects a specific target.

The system 100 includes a coherent illuminator 150 arranged to project coherent light along a projection axis that extends forward from the host vehicle 110. For example, each of the coherent illuminator 150 is arranged to emit a coherent light beam 152 (e.g., including at least one of blue, green, red and infrared wavelengths). The coherent light beam 152 can be emitted, for example, as a series of time-multiplexed colors and/or spatially overlapping wavelengths. The coherent illuminator 150 can include an SLM 154 configured to generate at least one diffraction pattern. In a search mode, the coherent illuminator 150 can be programed to modulate the coherent light beam 152 to reflect a first-order diffraction pattern that is uniformly illuminated. The first-order diffraction pattern includes greatest intensities of the coherent light beam 152 along an axis of projection (e.g., bore-sighted). The diffraction pattern can be varied, so that a selected area ahead of the host vehicle 110 (e.g., the width of a traffic lane) can be uniformly illuminated (e.g., without dark areas).

The system 100 includes at least one 2D imager (two-dimensional imager), that is positioned at the front of the host vehicle 110. For example, the system 100 includes at least one 2D imager, such as right imager 160 and left imager 170. The right imager 160 is arranged to receive and process return reflections 162 from the emitted coherent light beam 152, while the left imager 170 is arranged to receive and process return reflections 172 from the emitted coherent light beam 152. The reflections 162 and reflections 172 can be processed to detect, for example, a target.

An example 2D imager can include an image sensor having rows and columns of light-sensitive (optionally including infrared-sensitive) sensor pixels. Each sensor pixel can be sensitive to a selected band of light frequencies (e.g., a blue, green, red or infrared band). Values of selected sensor pixels (e.g., adjacent sensor pixels) can be simultaneously integrated (e.g., exposed to light) and read by a processor to selectively determine a color (e.g., as an RGB value and/or infrared value) for a pixel for an electronic image. An image frame (e.g., an electronic image) can be generated by determining the values for groups of different selected pixels of the image sensor. The image frame can be one frame of a sequence of frames (e.g., a video stream) generated by a 2D imager (e.g., so that the host vehicle 110 can continue to scan for yet-to-appear targets while being driven).

Azimuth (and/or elevation) of uniformly-illuminated targets can be determined by processing an image frame generated by either (or both) the right imager 160 or the left imager 170. The ADAS processor 120 can process the generated image frame to determine the which pixels in the image frame are illuminated by the emitted coherent light beam 152. Azimuth (and/or elevation) can be determined by associating image frame addresses of the illuminated pixels with an angular position (e.g., azimuth and/or elevation). The angular position can be determined in response to system geometries such as focal length of the imager used to generate the image frame.

Various transmission ranges of emitted wave energy (e.g., 152, 162 and 172) can vary with respect to the host vehicle 110. The actual limits of the various transmission ranges vary in response to atmospheric conditions such as rain, snow, sleet, fog, smoke, dust, and the like. Opaque or diffractive contaminants on surfaces (e.g., external surfaces) of the lenses (e.g. including optical filters and/or windows) of the optical components of the coherent illuminator 150, right imager 160 and left imager 170. Accordingly, range information determined in response to the intensity of a reflection can be unreliable, which can compromise the safety of a driven vehicle. As described hereinbelow with respect to FIG. 5 and FIG. 6 range from at least one imager to a target can be determined in response to a system geometry of emitting and receiving reflections of coherent light (e.g., without necessarily relying upon time-of-flight of pulsed lasers).

As described hereinbelow with respect to FIG. 2 and FIG. 3 (for example), one or more SLMs can be programed to generate diffraction patterns for illuminating portions of selected regions of interest. Each spatial light modulator includes an array of pistons (e.g., piston micromirrors) in which each piston can be positioned (e.g., in response to programing instructions) to a selected height above a substrate of the SLM. For example, a diffraction pattern can be generated by programming an optical surface of an SLM to generate a 3D (three-dimensional) surface that includes selected height variations of the pistons (e.g., where the programed contours of the 3D surface include a phase hologram). The selectable height variations of a piston can be selected in increments of a fraction of the wavelength of coherent light to be reflected from the optical surface of the SLM. Examples of far-field image diffraction patterns generated from the programed phase hologram are described hereinbelow with respect to FIG. 4.

In an example, an SLM can include rows and columns of pistons. Each piston can be positioned at one of four heights: a top height; the top height minus a quarter wavelength of the incident coherent light; the top height minus a half wavelength of the incident coherent light; and the top height minus a three-quarter wavelength of the incident coherent light. (Other incremental fractions of the wavelength of the incident coherent light can be used.) In an example (in which four discrete heights for each piston are used), 80 percent of the light energy can be directed toward an illuminated portion of a frame of light to be projected by the coherent illuminator 150. Diffracting the light toward a portion of a frame that is to be illuminated increases the efficiency of the light (e.g., as compared against efficiencies of systems that block or trap light when projecting image frames of pixels of various intensities). The SLM 154 is programmable (e.g., by positioning pistons of an array of positionable pistons) to diffract the coherent light toward a region of interest indicated by a sensor to diffract the coherent light toward a region of interest indicated by a sensor, for example.

Other orientations of the coherent illuminator 150, the right imager 160 and left imager 170 are possible. For example, the coherent illuminator 150, the right imager 160 and the left imager 170 can be arranged to face the rear of the host vehicle 110, so that safety while backing the host vehicle 110 can be enhanced.

Figure 2:
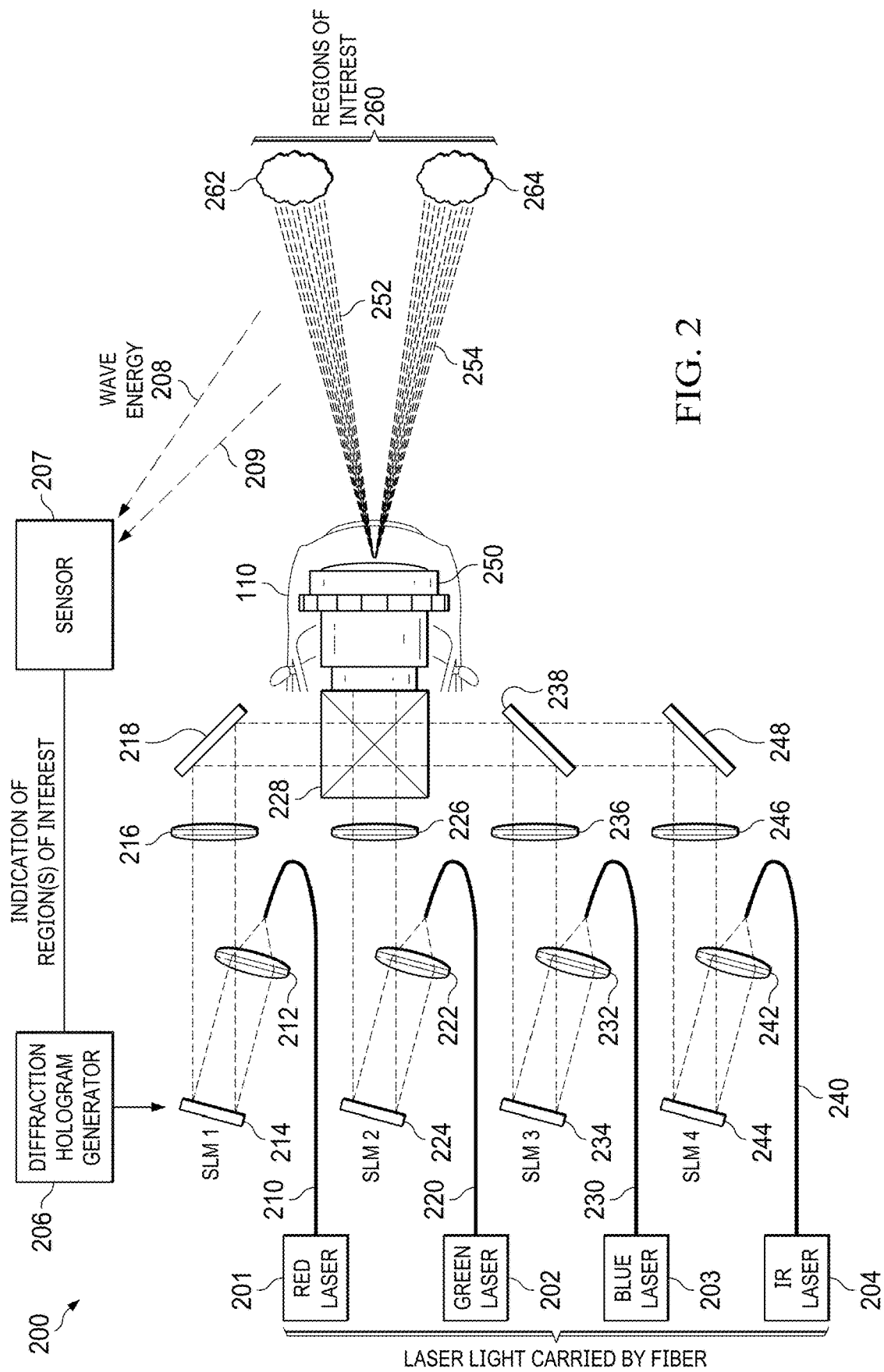
FIG. 2 is a side view of an example phased spatial light modulation (SLM) imaging system for uniform illumination of regions of interest.

FIG. 2 is a side view of an example phased spatial light modulator (SLM) 3D imaging system for uniform illumination of regions of interest. Generally described, the illumination system 200 is an example illumination system that includes elements such as light sources 201 (e.g., a red laser), 202 (e.g., a green laser, 203 (e.g., a blue laser) and 204 (e.g., an infrared laser), fiber optics 210, 220, 230 and 240 (for respectively carrying coherent light of respective wavelengths), source lenses 212, 222, 232 and 242, SLMs 214, 224, 234 and 244, hologram output lenses 216, 226, 236 and 246, color-combining prism 228, and mirrors 218, 238 and 248, and projection focusing element 250.

A diffraction pattern generator 206 is coupled to program a diffractive optical element (such as the SLMs 214, 224, 234 and 244) to generate phase-modulated coherent light for projection as a far-field image (described herein below with respect to FIG. 4). The diffraction pattern generator is arranged to configure each piston of the SLM such that the coherent light is directed toward at least one region of interest (e.g., 262 and/or 264). The at least one selected region of interest can be determined by the ADAS processor 120 arbitrarily or by at least one sensor (e.g. 207) in response to wave energy (e.g., 208 and/or 209) reflected by an object in a region of interest.

The coherent light sources 201, 202, 203 and 204 can be independently controllable lasers such as laser diodes. Each coherent light source is optically coupled to direct coherent light upon a respective SLM. Light from a first coherent light source (e.g., light source 201) is optically coupled to a first diffractive optical element (e.g., SLM 214) via fiber optics 210 and source lens 212. Light from a second coherent light source (e.g., light source 202) is optically coupled to a diffractive optical element SLM (e.g., SLM 224) via fiber optics 220 and source lens 222. Light from a third coherent light source (e.g., light source 203) is optically coupled to a third diffractive optical element (e.g., SLM 234) via fiber optics 230 and source lens 232. Optionally, light from a fourth coherent light source (e.g., light source 204) is optically coupled to a diffractive optical element SLM (e.g., SLM 244) via fiber optics 240 and source lens 242. At least one SLM is a diffractive optical element programmable to diffract the coherent light to generate diffracted coherent light.

The light sources 201, 202, 203 and 204 can be formed in separate substrates or the same substrate in which various light-emitting portions thereof can be individually and selectively controlled. The light sources 201, 202, 203 and 204 can be tuned to generate respective coherent light beams having different wavelengths (e.g., for generating visible and/or infrared light in controlled combinations).

While three visible light sources are described, various examples can include more or less numbers of light sources at different times and include differing respective color gamuts. The infrared light source can be used (e.g., by itself) to illuminate regions of interest 262 and 264 (e.g., to generate a monochrome image of reflectivity). The light source 204 (e.g., which is configured to generate light that includes an infrared wavelength) can be selectively activated in a night driving mode and/or when areas of lowered visibility due to fog or smoke are detected by the sensor 207, for example. The light sources can be time-multiplexed (e.g., so that one SLM is used to generate successive diffraction patterns, which reduces costs), optically merged (e.g., so that multiple light sources increase the intensity of the projected diffracted coherent beams 252 and 254) or perform combinations of time-multiplexing and optical merging. The light sources can be continuously on (for increased imager integration times) and/or pulsed (e.g., for determining ranges based on the propagation speed of light).

Coherent light is optically coupled (e.g., received) via respective fiber optics and is focused by respective source lenses upon an active surface (e.g., micromirrors of an array of pistons) of a respective SLM. A source lens can be arranged to direct light at an angle (e.g., selected from a range of 20 through 30 degrees from perpendicular) onto the active surface of a respective SLM. For example: the source lens 212 is arranged to focus light coupled by fiber optics 210 onto the active surface of the SLM 214; the source lens 222 is arranged to focus light coupled by fiber optics 220 onto the active surface of the SLM 224; the source lens 232 is arranged to focus light coupled by fiber optics 230 onto the active surface of the SLM 234; and the source lens 242 is arranged to focus light coupled by fiber optics 240 onto the active surface of the SLM 244. In another example, different coherent light sources can be coupled to a same SLM (e.g., where light source 201 and light source 204 are optically coupled to 201) via optical elements such as fiber optics, source lenses, and a combining prism/mirrors assembly (e.g., similar to prism 228).

The SLMs are arranged to generate structured light by spatially phase shifting a received wavefront of coherent light (e.g., having a same, selected frequency and phase of light) that is received from a respective source lens. The generated structured light can have a range of view of 5 through 20 degrees. For example: an SLM 214 is coupled to generate a first diffractive pattern for diffracting coherent light generated by the light source 201; an SLM 224 is coupled to generate a second diffractive pattern for diffracting coherent light generated by second light source 202; an SLM 234 is coupled to generate a third diffractive pattern for diffracting coherent light generated by the light source 203; and an SLM 244 is coupled to generate a fourth diffractive pattern for diffracting coherent light generated by light source 204. Each SLM can be programmed (e.g., by the diffraction pattern generator 206) with a diffractive pattern to generate contours of an active surface of a respective SLM, so that the optically active surface is configured to diffract incident coherent light with selected diffraction patterns. The diffraction pattern generator 206 can determine the diffractive pattern in response to a wavelength of the coherent light beam optically coupled to a respective SLM and the selected (e.g., desired) direction of the diffracted light.

Each SLM (214, 224, 234 and 244) can be programmed (by generating a physical surface for diffracting received light to illuminate the regions of interest 260) to phase shift a received wavefront. Each SLM includes a respective array of pistons in which a reflective surface (e.g., top) of each piston of the SLM is moved to a degree of extension (e.g., height) responsive to a programming of the SLM. The received wavefronts are phase shifted by a selected fraction of a wavelength of the received coherent light, so that the distance of mirror-travel to generate the phase-shift (e.g., assuming a common speed of propagation of light) is determinable in response to the wavelength of the received wavefront. The wavefronts can be phase shifted by one wavelength by a respective SLM by actuating selected pistons of the SLM to move a respective micromirror by a distance that is one-half of a wavelength of the coherent light (e.g., a movement of a micromirror affects the phase shift by a factor of two because of the two-way path of the reflected light through the same "delta" in distance traversed by a micromirror from a zero-phase shift position). In an example where at least one sensor is coupled to the SLM, and the at least one sensor is adapted to generate an at least one indication of the at least one region of interest, the pistons of the array of pistons can be positioned to diffract the coherent light responsive to the at least one indication of the at least one region of interest. (A sensor can be coupled to the SLM via a processor such as ADAS processor 120, so that, for example, the SLM can be operated in response to a sensor, a processor, or both the sensor and processor.)

The diffracted beams of coherent light generated by the SLMs 214, 224 and 234 are respectively focused by output lenses 216, 226, 236 and 246, reflected by mirrors 218, 238 and 248, merged by color-combining prism 228 and projected by focusing element 250 as a far-field image. The far-field image can be projected within a projection field of view (e.g., of the focusing element 250) responsive to the focusing element (e.g., where the projection field of view can be determined responsive to the ranges of azimuths and elevations that can be illumined by light coupled through the focusing element 250). The focusing element 250 is an optical element that is configurable to focus (e.g., project) the diffracted coherent light toward a region of interest, which is within a projection field of view (e.g., where the at least one region of interest at least overlaps with the projection field of view). The region of interest can be an at least one selected region of interest, where the at least one selected region of interest is within a projection field of view of the focusing element.

The wavefronts of the projected diffracted coherent beams 252 and 254 constructively interfere to uniformly illuminate surfaces of objects within the regions of interest 262 and 264. The diffraction of the coherent light to constructively interfere within directions (e.g., azimuths and elevations) associated with the regions of interest 260 conserves energy and increases the intensity of light projected toward a region of interest (e.g., increased above the intensity that would otherwise result without the constructive interference within the directions associated with the regions of interest 260). Accordingly, the projected diffracted coherent light is concentrated within an area (e.g., smaller portion) of a region of interest, which increases illumination (without, for example, requiring more powerful light sources).

In the example, the respective SLMs are programed (e.g., by ADAS processor 120) with a diffraction pattern for illuminating (e.g., illuminating only) identified areas (262 and 264) of the regions of interest 260 with a uniform far-field image. Responsive to the programming of an SLM, the programed SLM generates a diffraction pattern that is expressed in a pattern of the comparative heights of the pistons of the piston array.

The diffractive pattern generated by the SLM includes comparatively varying heights of reflective surfaces that are adapted to generate contours to diffract light into areas of constructive interference (as well as areas of destructive interference). For example, a uniform far-field image can be an image where the identified area is illuminated by constructive interferences, so that any object in the identified area can be more brightly illuminated (e.g., for purposes of detection and ranging). The more brightly uniformly illuminated object can be better detected visually, can be better detected by-near infrared light; can be better illuminated as a selected visible color (primary or non-primary color); and/or better imaged to detect a reflected color (e.g., so that an imaged red octagon can be better identified as a stop sign).

Figure 3:
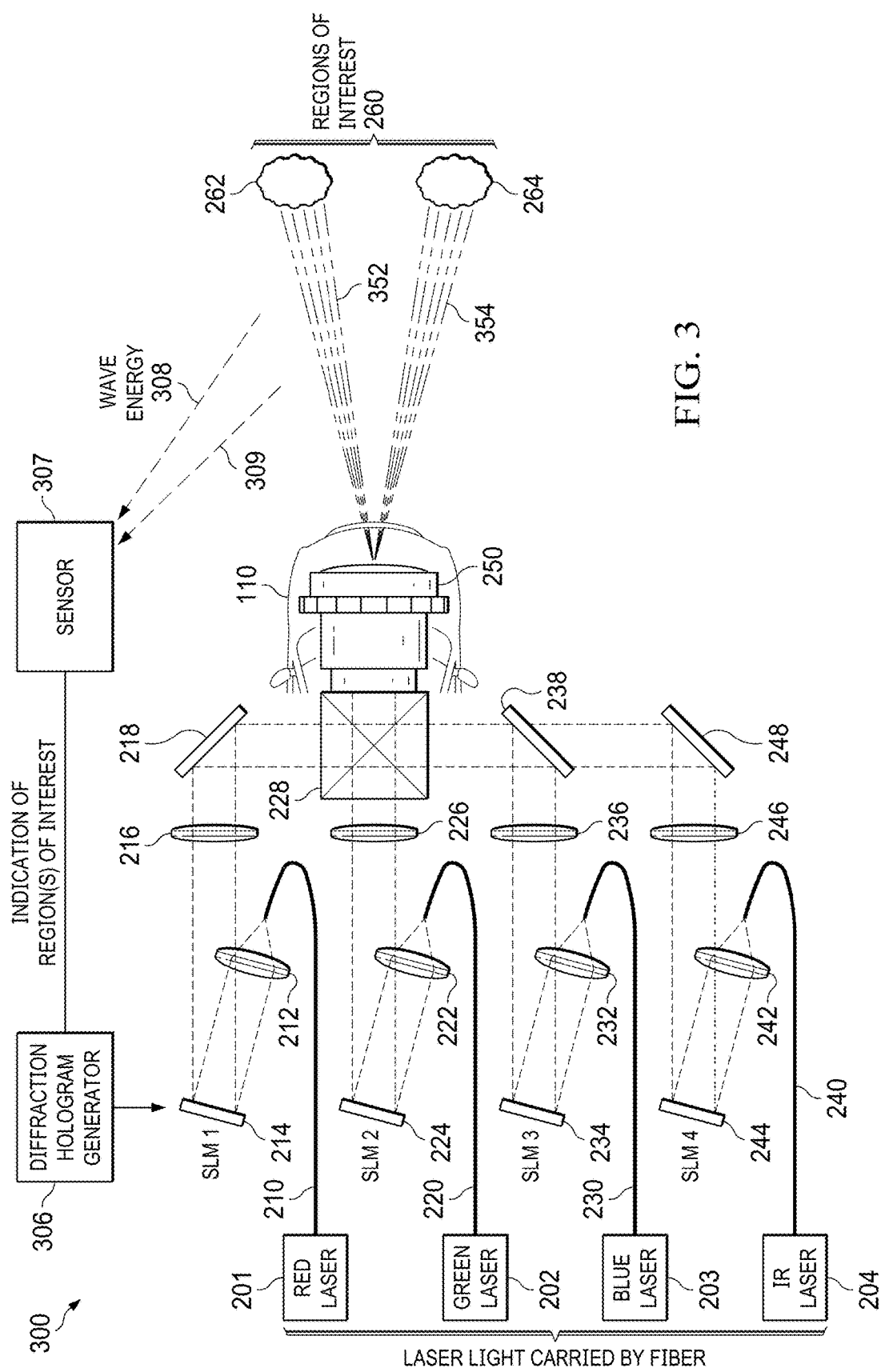
FIG. 3 is a side view of an example phased spatial light modulation (SLM) 3D imaging system for patterned illumination of regions of interest.

FIG. 3 is a side view of an example phased spatial light modulator (SLM) 3D imaging system for patterned illumination of regions of interest. The illumination system 300 is an example illumination system that includes a diffraction pattern generator 306 that is configured to generate diffraction patterns for programing SLMs (e.g., 214, 224, 234 and 244). The SLMs are diffractive optical elements, in which at least one (e.g., each) SLM is programmable to diffract incident coherent light (e.g., coherent light directed toward the SLM) to generate a far-field image that includes at least one diffraction pattern having at least one discernable feature (e.g., described hereinbelow with respect to FIG. 4) The far-field image includes projected light for illuminating objects within the regions of interest 260. For example, the diffracted coherent beam is projected from focusing element 250 as the projected diffracted coherent beams 352 and 354 for respectively illuminating (e.g., with a respective patterned far-field image) the regions of interest 262 and 264. The patterned far-field images include structured light patterns, which can be detected as wave energy 308 and 309 by sensor 307. The sensor 307 can generate an indication of at least one region of interest in response to the detected wave energy. As described hereinbelow with respect to FIG. 4, FIG. 5 and FIG. 6, range information can be determined from discernable features of the structure light patterns of the patterned far-field images.

Figure 4:
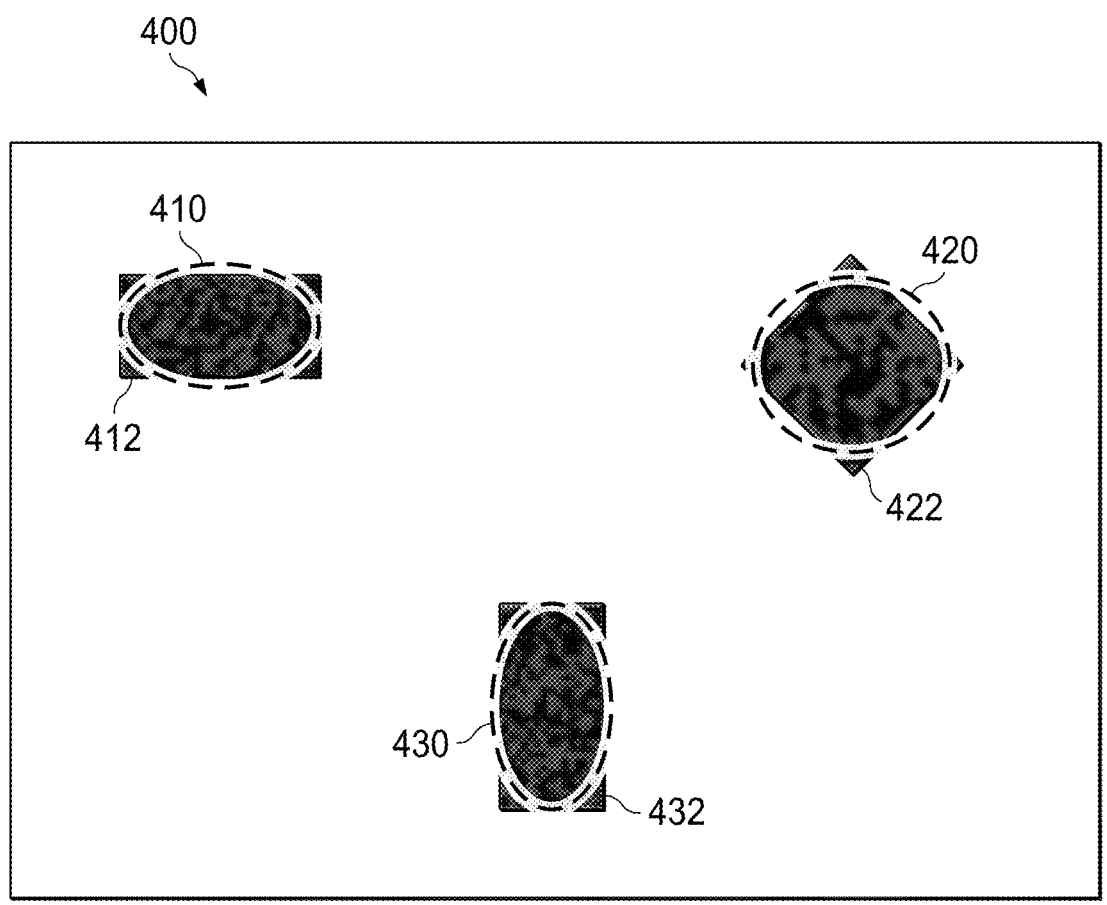
FIG. 4 is a front view of example structured light patterns for determining range of objects in regions of interest.

FIG. 4 is a front view of example structured light patterns for determining range of objects in regions of interest. For example, view 400 includes diffraction patterns that include structured light patterns 412, 422 and 434. Each structured light pattern includes at least one discernable feature (e.g., or at least two discernable features, for purposes of mapping illuminated objects). Each of the at least one discernable feature is discernable by at least one contrasting parameter, such as intensity (e.g., bright or dim) and/or frequency (e.g., reddish or blueish). When intensity is the contrasting parameter (for example), one phase hologram (e.g., a single phase hologram) can be used to generate (e.g., simultaneously generate) each of the structured light patterns 412, 422 and 434.

The structured light patterns 412, 422 and 432 are projected using (e.g., within a range of) azimuths and elevations associated with respective regions of interests 410, 420 and 430. The regions of interests 410, 420 and 430 can be identified by the ADAS processor 120 in response to detection of reflected wave energy (as described hereinabove with respect to sensors 207 and 307, for example). The projected structured light patterns 412, 422 and 434 contain discernable features (e.g., dots, vertical and/or horizontal lines, grids, and other discernable displayed information) that are discernable (e.g., identifiable) even when the pattern is distorted in an image frame. The pattern can be distorted by a difference in perspective between the illuminator and the imager when the pattern is projected on an uneven surface (which includes differences in range to the imager). Differences in range can also result when an imaged, pattern-illuminated object is narrower than the vertical and/or horizontal angles subtended by the surrounding region of interest. The projected light patterns are stored as a reference image for comparison against image frames generated by at least one imager (e.g., 2D imager). Monocular and stereo imaging geometries for determining range information from imaged patterned-illuminated objects is described hereinbelow with reference to FIG. 5 and FIG. 6.

Figure 5:
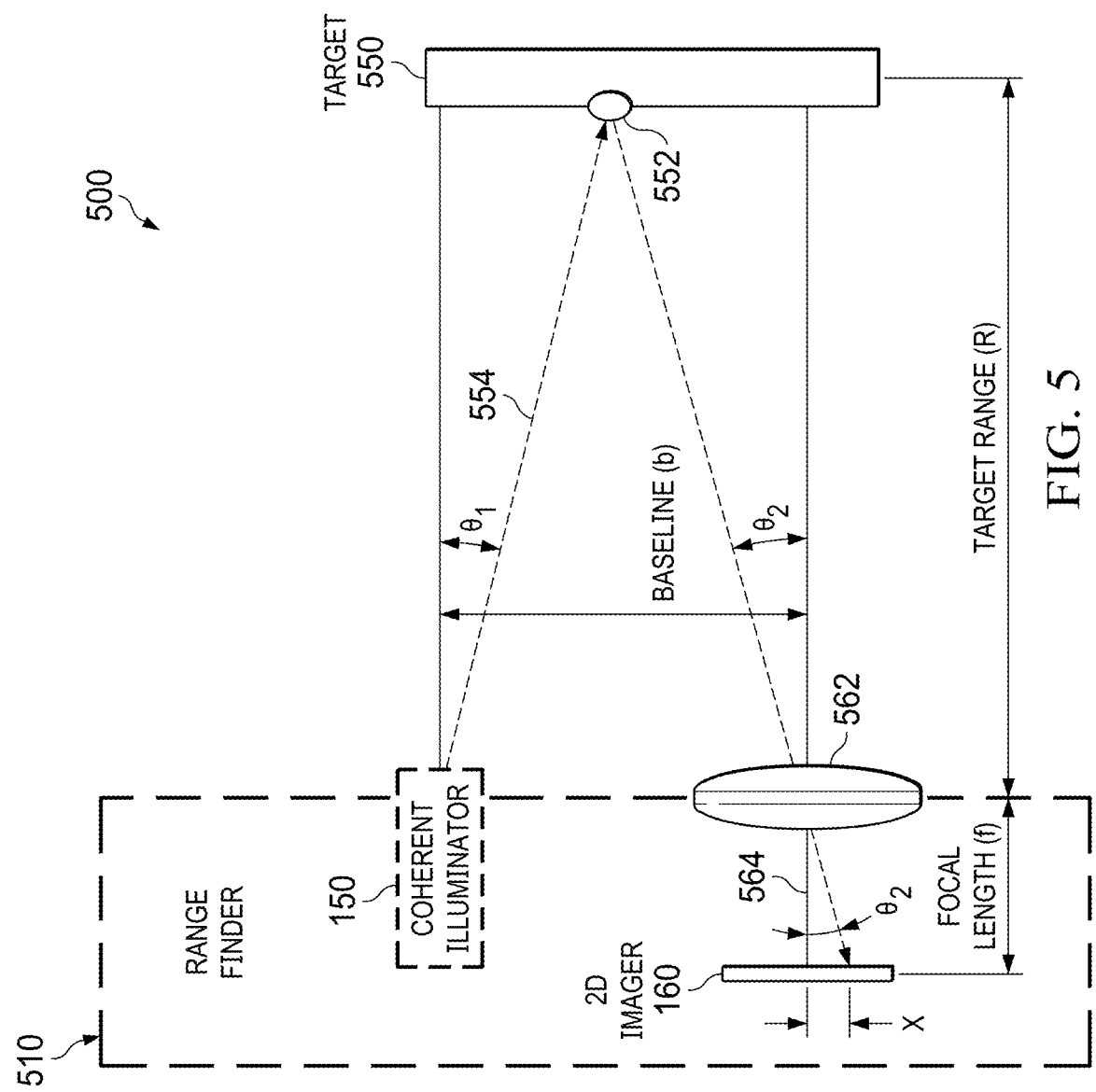
FIG. 5 shows an example geometry for determining range information from a patterned-illuminated object image that is generated by a single 2D imager.

FIG. 5 shows an example geometry for determining range information from a patterned-illuminated object image that is generated by a single 2D imager. Geometry 500 is an example geometry that includes a range finder 510 and a target 550. The range finder 510 includes a coherent illuminator 150 and a 2D imager 160. The coherent illuminator 150 is aligned with the 2D imager, so that a baseline (b) is established having a given distance. In at least one example: a range finder is configured to receive an at least one reflection from an object illumined by the far-field image; the at least one reflection including the at least one discernable feature; and the range finder being configurable to determine a range in response to the reflection from the object illumined by the far-field image that includes the at least one discernable feature.

A notional triangle 554 is formed that includes: a height determined by a range R (e.g., target range) from the baseline b to the target 150 and a hypotenuse determined (at least in part) by an angle $\theta_1$ of coherent light emitted by the coherent illuminator 150. The angle $\theta_1$ (e.g., off-boresight angle) can be determined responsive to the diffraction pattern selected to generate (e.g., for diffracting and projecting) the structured light pattern.

A notional triangle 564 is formed that includes: a height determined by a given focal length f (e.g., of imager lens 562) of the 2D imager 160; a base determined by an offset x; and an angle $\theta_2$ determined by the base and height (e.g., as a function of the focal length and the offset x). The offset x is determinable in operation by comparing the offset location x of a diffraction pattern feature in a received image frame generated by the 2D imager 160 against a corresponding location of the diffraction pattern feature of the reference image used to illuminate the target with the diffraction pattern (e.g., ideal diffraction pattern). The reflection point 552 can be determined responsive to the baseline b, the angle $\theta_1$ and the angle $\theta_2$. Accordingly, the range R can be determined as:

$$R = \frac{b \cdot f}{x + f \cdot \tan(\theta_1)} \quad (1)$$

In at least one example, the range finder is configurable to determine the range in response to a distance between the focusing element and a lens of an imager, and in response to a focal length of the imager.

The techniques described hereinabove (e.g., with respect to geometry 500) to determine range in an "x"-dimension can be extended to determine range information in a "y"-direction, so that 3D surfaces of illuminated objects can be mapped and compared with libraries of mapped components to enhance (for example) safety or security. The component libraries can include 3D maps for identifying faces, traffic signals, traffic signs, pedestrian and animal shapes, kinds of vehicles, posts, guardrails, road markings, and other kinds of objects of interest in a field of view that can be associated with a selected kind of a 3D application. For example, an infrared-beam emitting coherent illuminator 150 can illuminate objects beyond the host vehicle 110 headlight range, so that an ADAS processor 120 can classify the illuminated objects and, in response to the classifying, initiating a specific driving action (e.g., warn the driver, steer at least one headlight and automatically steer and/or brake the host vehicle 110).

Systems in accordance with geometry 500 can be economically produced because (for example) of the ubiquity of components produced for illuminated imagers.

Figure 6:
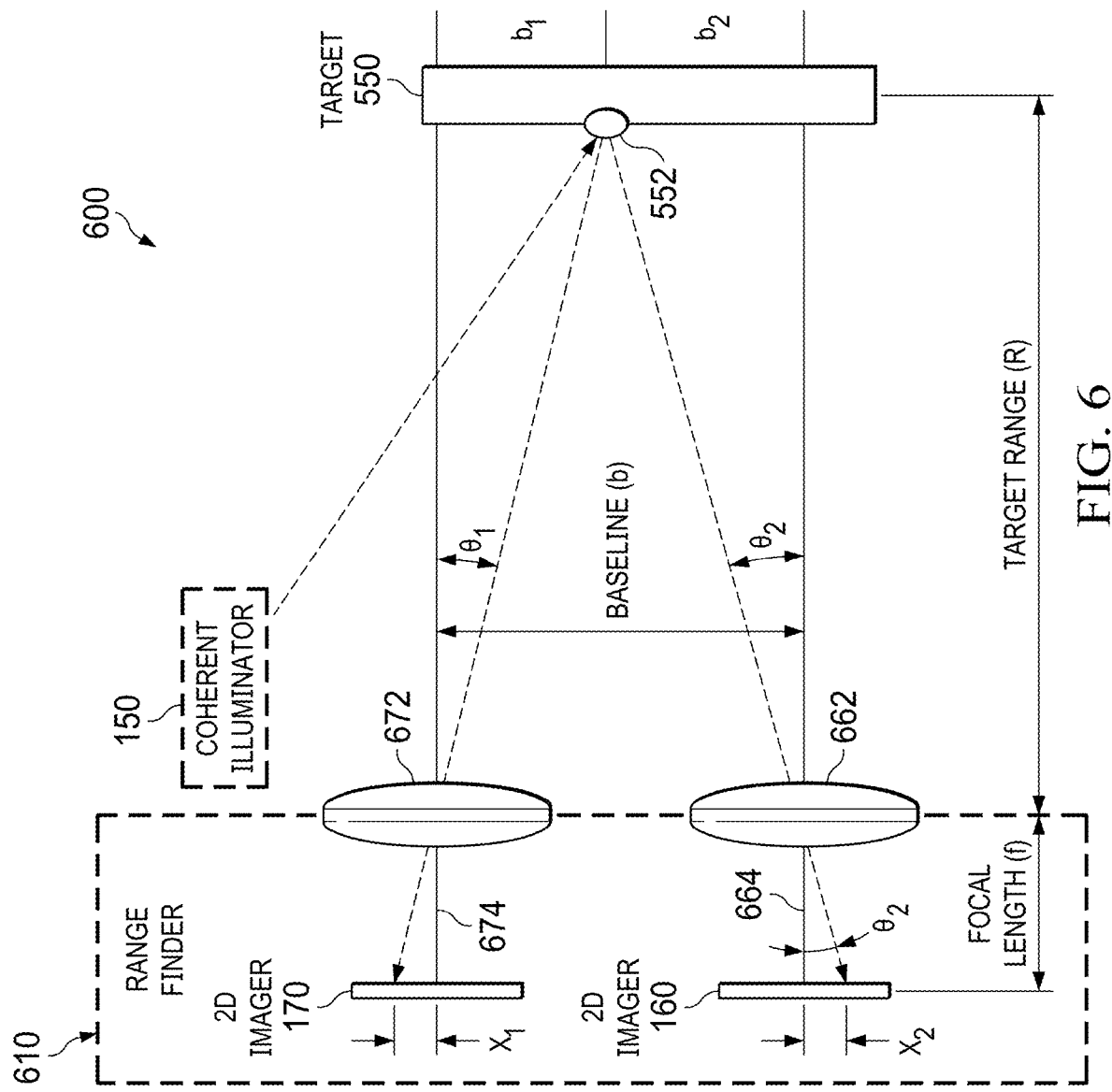
FIG. 6 shows an example geometry for determining range information from a patterned-illuminated object image that is generated by a pair of 2D imagers.

FIG. 6 shows an example geometry for determining range information from a patterned-illuminated object image that is generated by a pair of 2D imagers. Geometry 600 is an example geometry that includes a range finder 610 and a target 550. The range finder 610 includes a 2D imager 160 and a 2D imager 170. The coherent illuminator 150 can be optionally mounted to the range finder 510, the host vehicle 110 or another location. The 2D imager 160 is aligned with the 2D imager 170, so that a baseline (b) is established having a given distance. The 2D imagers 160 and 170 can be a stereo imager.

A notional triangle 664 is formed that includes: a height determined by a given focal length f (e.g., of imager lens 662) of the 2D imager 160; a base determined by an offset $x_2$; and an angle $\theta_2$ determined by the base and height (e.g., as a function of the focal length and the offset $x_2$). The offset $x_2$ is determinable in operation by comparing the offset location $x_2$ of a diffraction pattern feature in a received image frame generated by the 2D imager 160 against a corresponding location of the diffraction pattern feature of the reference image used to illuminate the target 550 with the diffraction pattern. A notional triangle 674 is formed that includes: a height determined by a given focal length f (e.g., of imager lens 672) of the 2D imager 170; a base determined by an offset $x_1$; and an angle $\theta_1$ determined by the base and height (e.g., as a function of the focal length and the offset $x_1$). The offset $x_1$ is determinable in operation by comparing the offset location $x_1$ of a diffraction pattern feature in a received image frame generated by the 2D imager 170 against a corresponding location of the diffraction pattern feature of the reference image used to illuminate the target 550 with the diffraction pattern. The reflection point 552 can be determined responsive to the baseline b, the angle $\theta_1$ and the angle $\theta_2$. (The reflected light can be diffused across a range of angles because of irregularities that are present in the surface of the target 550, for example.) Accordingly, the range R can be determined as:

$$R = \frac{b * f}{x_1 + x_2} \quad (2)$$

In at least one example, the range finder is configurable to determine the range in response to: a distance between a first lens of a first imager and a second lens of a second imager;

in response to a focal length of the first imager; and in response to a focal length of the second imager.

Systems in accordance with geometry 600 can be economically produced because (for example) of the presence (if not ubiquity) of components produced for illuminated imagers. Systems in accordance with geometry 600 can also generate range information in systems where the alignment of the illuminator 150 is unknown (e.g., not captivated by the host vehicle 110) and/or uncertain (e.g., not calibrated).

The performance (include safety and security aspects) of systems can be enhanced by using the systems and methods described herein. For example, the range of the illuminator can be increased to the order of hundreds of meters, which can increase the range at which objects (such as potential intruders for security systems or potholes for ADAS systems) can be detected, mapped for identification and system action taken in response to the identification as described herein.

Figure 7:
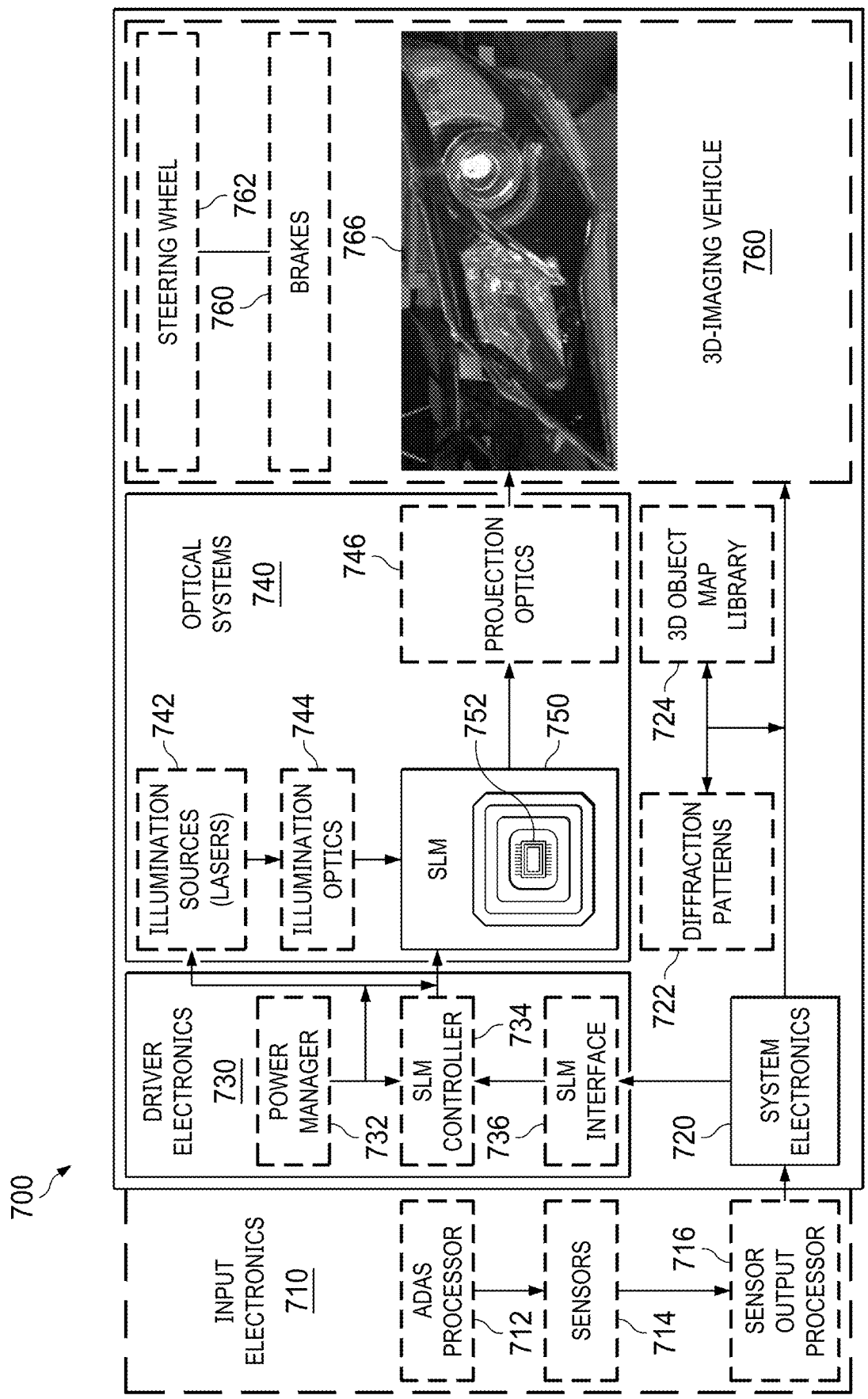
FIG. 7 is a system diagram showing an example vehicle-based phased spatial light modulation (SLM) 3D imaging system.

FIG. 7 is a system diagram showing an example vehicle-based phased spatial light modulation (SLM) 3D imaging system. The vehicle system 700 is an example vehicle system that includes input electronics 710, system electronics 720, driver electronics 730, optical systems 740 and a host vehicle 760. The host vehicle can be a host vehicle such as a host vehicle 110. The phased spatial light modulation (SLM) 3D imaging system of the vehicle system 700 can be used in other systems such as security and/or manufacturing systems, for example.

The input electronics 710 can include an ADAS (advanced drivers assistance system) processor 712 for sensor-assisted safety augmentation when driving the host vehicle 760. Some functions (e.g., processing functions) of the ADAS processor 712 can be performed by the system electronics 720. The ADAS processor 712 is coupled to various sensors 714 for electronically and/or optically sensing the position of surrounding objects. Examples of the various sensors 714 can include the radar and coherent light illuminator/imager elements described hereinabove (e.g., with respect to FIG. 1) and sonic (e.g., ultrasonic) and/or inductive proximity detectors. Outputs of the various sensors 714 are processed to generate an indication (e.g., electronic indication) that identifies at least one region of interest (e.g., adjacent to the host vehicle 760) that includes a detected object. For example, a radar return signal or video image from sensor 714 can be processed by a sensor output processor to determine the presence of an object in at least one region of interest monitored by respective sensor 714.

The system electronics 720 are coupled to receive indications of the regions of interest adjacent to the host vehicle 760. The system electronics 720 are arranged to control the driver electronics 730. For example, the system electronics can select an operating mode base on time-of-day, ambient lighting conditions, locations of indicated regions of interest or other considerations. In response to the selected operating modes, the system electronics can select a phase hologram from the diffraction patterns 722 to program (via the SLM interface 736) the SLM controller 734 for generating an optical surface for modulating incident coherent light. The power manager 732 can selectively power coherent illumination sources 742 for generating illuminating the indicated regions of interest with a far-field diffractive image.

The optical systems 740 includes illumination sources 742 (such as laser diodes) for generating coherent light of selected wavelengths. The illumination sources 742 are selectively activated by the power management 732 circuitry, so that a piston array 752 of the SLM 750 is illuminated (via illumination optics 744) with at least one illumination source 742. The coherent light that is reflected/diffracted by the piston array 752 of the SLM 750 is projected by the projection optics 746 toward each of the indicated regions of interest. Imagers of the sensors 714 are responsive to the wavelengths of the projected diffraction patterns and generate image frames in response. The image frames of the projected diffraction patterns can be processed by the sensor output processor 716 to enhance the contrast of the image frames of coherently illuminated objects.

The system electronics 120 (e.g., while performing ADAS functions) processes the image frame of coherently illuminated objects and can take an action to enhance the safety of the host vehicle 760. The system electronics 720 compares received discernable diffraction patterns of a received image frame with corresponding discernable features of a reference image from the diffraction patterns 722 to determine range. The system electronics 720 can also compare range information (derived from the discernable features in the diffraction pattern of a received image frame) with corresponding range information of the 3D object map library 724, so that the kinds of objects in an indicated region of interest can be determined (e.g., identified). The system electronics 720 can integrate data from various sensors (such as an instant speed and position of the steering wheel) with range information to determine an appropriate action to take in response to the integrated data.

For example, the speed and direction of the vehicle can be controlled by selectively controlling the accelerator (not shown), the steering wheel 762 and the brakes 764. Moreover, the beams projected from the headlights can be steered or selectively masked in response to the identification (e.g., from comparing generated range information with 3D object maps), so that (for example) the glare of the beams projected toward another driver or a pedestrian is reduced (which enhances the safety of the other driver and/or pedestrian).

An example method of certain techniques described herein includes: programing a phased spatial light modulator (SLM) to generate a diffraction pattern in response to an at least one region of interest; optically coupling a coherent light beam to form a coupled coherent light that is coupled from a coherent light source to illuminate the SLM, so that diffracted coherent light is generated by the SLM responsive to the diffraction pattern and the coupled coherent light from the coherent light source; and projecting the diffracted coherent light toward the at least one region of interest.

An example method of certain techniques described herein can further include generating diffracted coherent light that includes predetermined discernable features.

An example method of certain techniques described herein can further include generating an imaged reflection responsive to imaging an at least one reflection of the diffracted coherent light that includes an at least one predetermined discernable feature, wherein the at least one reflection of the diffracted coherent light that includes the at least one predetermined discernable feature is generated by an at least one target illuminated by the diffracted coherent light projected toward the at least one region of interest.

An example method of certain techniques described herein can further include generating range information in response to an at least one offset of the at least one predetermined discernable feature of the imaged reflection of the diffracted coherent light that includes the at least one predetermined discernable feature.

An example method of certain techniques described herein can further include: classifying the target in response to the at least one reflection of the diffracted coherent light that includes the at least one predetermined discernable feature; and initiating a specific driving action in response to the classifying of the target.

Modifications are possible in the described embodiments, and other embodiments are possible, within the scope of the claims.

What is claimed is:

1. An apparatus comprising:
a phased spatial light modulator (SLM);
a coherent light source optically coupled to the phased SLM, the phased SLM controllable to generate a diffraction pattern in response to an identified region of interest;
a focusing element optically coupled to the phased SLM, the focusing element configured to project the diffraction pattern toward the region of interest; and
a range finder configured to receive a reflection from an object in the region of interest and in response determine a range of the object.

2. The apparatus of claim 1, wherein the region of interest is within a projection field of view of the focusing element.

3. The apparatus of claim 1, wherein the phased SLM includes an array of pistons.

4. The apparatus of claim 3, wherein pistons of the array of pistons are positionable to generate the diffraction pattern.

5. The apparatus of claim 4, further comprising a sensor coupled to the phased SLM, the sensor adapted to generate an indication of the region of interest, the pistons of the array of pistons being positionable to generate the diffraction pattern responsive to the indication of the region of interest.

6. The apparatus of claim 1, wherein the coherent light source is a first coherent light source and the phased SLM is a first phased SLM, and the apparatus further comprises: a second coherent light source coupled to a second phased SLM; and a third coherent light source coupled to a third phased SLM.

7. The apparatus of claim 1, wherein the coherent light source is a first coherent light source, and the apparatus further comprises: a second coherent light source coupled to the phased SLM; and a third coherent light source coupled to the phased SLM.

8. The apparatus of claim 1, wherein the coherent light source is configured to generate infrared light.

9. The apparatus of claim 1, wherein the region of interest is determined by a ranging sensor.

10. The apparatus of claim 1, wherein the phased SLM is controllable to generate a far-field image that includes the diffraction pattern, which has a discernable feature.

11. The apparatus of claim 10, wherein the reflection includes the discernable feature, and wherein the range finder is configurable to determine the range in response to the reflection from the object illumined by the far-field image that includes the discernable feature.

12. The apparatus of claim 11, wherein the range finder is configurable to determine the range in response to a distance between the focusing element and a lens of an imager, and in response to a focal length of the imager.

13. The apparatus of claim 11, wherein the range finder is configurable to determine the range in response to: a distance between a first lens of a first imager and a second lens of a second imager; in response to a focal length of the first imager; and in response to a focal length of the second imager.

14. A system, comprising:
a phased spatial light modulator (SLM);
a processor coupled to the phased SLM, the processor configured to control the phased SLM to generate a diffraction pattern in response to a region of interest, the diffraction pattern including an area of constructive interference;
a coherent light source optically coupled to direct coherent light upon the phased SLM, the phased SLM is-configured to diffract the coherent light responsive to the diffraction pattern to generate diffracted coherent light;
an optical element configurable to focus the diffracted coherent light toward the region of interest; and
a range finder configured to determine a range of an object in the region of interest.

15. A method, comprising:
controlling a phased spatial light modulator (SLM) to generate a diffraction pattern in response to a region of interest;
optically coupling a coherent light beam to form a coupled coherent light from a coherent light source to illuminate the phased SLM, so that diffracted coherent light is generated by the phased SLM responsive to the diffraction pattern and coherent light from the coherent light source, the diffracted coherent light including a-discernable features;
projecting the diffracted coherent light toward the region of interest; and
receiving an imaged reflection from a target illuminated by the diffracted coherent light projected toward the region of interest, the imaged reflection including at least one of the discernable features.

16. The method of claim 15, wherein the generated diffracted coherent light includes multiple discernable features.

17. The method of claim 16, wherein the imaged reflection includes multiple discernable features.

18. The method of claim 17, further comprising generating range information in response to an offset of the at least one of the multiple discernable features of the imaged reflection.

19. The method of claim 18, further comprising:
classifying the target in response to the at least one discernable feature of the imaged reflection; and
initiating a specific driving action in response to the classifying of the target.

\* \* \* \* \*